United States Patent
Kolle et al.

(10) Patent No.: US 11,994,019 B2
(45) Date of Patent: May 28, 2024

(54) PERFORATION CLUSTER DESIGN METHOD AND SYSTEM BASED ON A HYBRID MODEL TO PREDICT PROPPANT DISTRIBUTION

(71) Applicant: GEODYNAMICS, INC., Millsap, TX (US)

(72) Inventors: Jack J. Kolle, Seattle, WA (US); Alan C. Mueller, Seattle, WA (US)

(73) Assignee: GEODYNAMICS, INC., Millsap, TX (US)

( * ) Notice: Subject to any disclaimer, the term of this patent is extended or adjusted under 35 U.S.C. 154(b) by 128 days.

(21) Appl. No.: 17/500,121

(22) Filed: Oct. 13, 2021

(65) Prior Publication Data

US 2022/0112802 A1 Apr. 14, 2022

Related U.S. Application Data

(60) Provisional application No. 63/091,638, filed on Oct. 14, 2020.

(51) Int. Cl.
*E21B 47/10* (2012.01)
*E21B 43/267* (2006.01)
(Continued)

(52) U.S. Cl.
CPC ........... *E21B 47/10* (2013.01); *E21B 43/267* (2013.01); *E21B 43/29* (2013.01); *G06F 30/28* (2020.01);
(Continued)

(58) Field of Classification Search
CPC ........ E21B 47/10; E21B 43/267; E21B 43/29; E21B 2200/20; G06F 30/28; G06F 2113/08; G06F 30/23
See application file for complete search history.

(56) References Cited

U.S. PATENT DOCUMENTS 9,367,653 B2 6/2016 Madasu et al.
11,225,855 B2 1/2022 McClure
(Continued)

OTHER PUBLICATIONS

Society of Petroleum Engineers; SPE-209178-MS; Modeling Proppant Transport in Casing and Perforations Based on Proppant Transport Surface Tests (SPE-209178-MS); Feb. 3, 2022, The Woodlands, Texas, USA.

*Primary Examiner* — Manish S Shah
*Assistant Examiner* — Michael J Singletary
(74) *Attorney, Agent, or Firm* — Morgan, Lewis & Bockius LLP

(57) ABSTRACT

A method for determining the distribution of a proppant and associated slurry exiting perforations made in a casing, which is placed in a well, includes receiving settling data describing the proppant settling in the casing; receiving a slip parameter describing a casing velocity of the proppant relative to a perforation velocity of the proppant; calculating with a computing device, based on a constant proppant concentration model, (1) initial flow rates $Q'(i)$ of the proppant through the perforations and (2) initial flow rates $Q'_{case}(i)$ of the proppant through the casing, wherein i is the number of perforations; and calculating with the computing device, based on (1) a variable proppant concentration model, (2) the settling data, (3) the slip parameter, (4) the initial flow rates $Q'(i)$ of the proppant through the perforations, and (5) the initial flow rates $Q'_{case}(i)$ of the proppant through the casing, normalized flow rates $Q'_s(i)$ of the proppant through the perforations.

7 Claims, 15 Drawing Sheets

(51) Int. Cl.
*E21B 43/29* (2006.01)
*G06F 30/28* (2020.01)
*G06F 113/08* (2020.01)

(52) U.S. Cl.
CPC ....... *E21B 2200/20* (2020.05); *G06F 2113/08* (2020.01)

(56) References Cited

U.S. PATENT DOCUMENTS

| | | |
|---|---|---|
| 11,359,479 B2 | 6/2022 | Singh et al. |
| 11,466,557 B2 | 10/2022 | Wang et al. |
| 1,149,406 A1 | 11/2022 | Isaev et al. |
| 2020/0380186 A1 | 12/2020 | Valiveti et al. |
| 2021/0096277 A1 | 4/2021 | Zaki et al. |
| 2021/0131261 A1* | 5/2021 | Wang .................... E21B 49/006 |
| 2022/0364454 A1* | 11/2022 | Alekseev .............. E21B 43/267 |
| 2022/0373711 A1 | 11/2022 | Weijers |

* cited by examiner

Volume Fraction of Sand
- 0.0876
- 0.0766
- 0.0657
- 0.0547
- 0.0438
- 0.0328
- 0.0219
- 0.0109
- 0.0000

MeanSandVolFrac: 0.04
ParticleDiameter: 0.15 (mm)
MeanVelocity: 5 (m/s)
PressureDrop: 17.3297 (KPa)

Volume Fraction of Sand
- 0.3000
- 0.2625
- 0.2250
- 0.1875
- 0.1500
- 0.1125
- 0.0750
- 0.0375
- 0.0000

MeanSandVolFrac: 0.04
ParticleDiameter: 0.42 (mm)
MeanVelocity: 5 (m/s)
PressureDrop: 20.2448 (KPa)

PERFORATION CLUSTER DESIGN METHOD AND SYSTEM BASED ON A HYBRID MODEL TO PREDICT PROPPANT DISTRIBUTION

BACKGROUND

Technical Field

Embodiments of the subject matter disclosed herein generally relate to a system and method for delivering a proppant to a perforated casing in a well, and more particularly, to estimating the distribution of the proppant through the perforations of the casing into the adjacent formation based on a hybrid model of proppant and/or slurry distribution. The method may be generalized to describing any complex physical system that involves conserved quantities and is amenable to first order analysis but requires numerical analysis of at least come components of the system.

Discussion of the Background

During a cased wellbore completion process, a gun string assembly is positioned in an isolated zone in the wellbore casing. The gun string assembly includes a plurality of perforating guns coupled to each other using connections such as threaded tandem subs. The perforating gun is then fired, creating holes through the casing and the cement and into the targeted formation. These perforating holes then allow fluid communication between the oil and gas in the rock formation and the wellbore. During the completion of an oil and/or gas well, the perforating guns carry explosive charges for perforating the casing. These charges are loaded in a perforation gun and are typically "shaped charges" that produce an explosively formed penetrating jet that is propelled in a chosen direction when detonated.

When a charge in a perforating gun system is detonated and the well is perforated, entrance holes are created in the well casing and the explosives create a jet that penetrates into the hydrocarbon formation. The "quality" of the perforations is important when considering the overall stage design. For example, the "quality" of perforations is determined by the entrance hole diameter and the perforation tunnel shape, length, and width. The diameter of the entrance hole depends upon a number of factors, including but not limited to, the nature of the liner in the shaped charge, the explosive type, the thickness and material of the casing, the water gap in the casing, centralization of the perforating gun, number of perforations in a cluster and number of clusters in a stage.

Due to the number of factors that determine the entrance hole size, the variation of the entrance hole diameter can be large and consequently affects the predictability of the stage design. Once the plug and perforations are placed, a fracturing slurry, i.e., a mixture of a fluid and a proppant, is injected into the well casing and is dispersed through the perforations along the well casing. The fraction of proppant entering the heel-ward clusters is often unintentionally lower than the fraction of proppant entering into the toe-ward clusters. The terms "heel-ward" and "toe-ward" are used herein to describe the locations relative to a slurry flow path. For example, the clusters that are exposed to the slurry first may be described as "heel-ward" clusters, whereas the clusters that are exposed to the slurry last just before reaching the toe, may be described as "toe-ward" clusters. The terms "heel" and "toe" are used herein to describe locations along a horizontal stage of the casing. For example, the "heel" of the stage is in an upstream end relative to the slurry flow path and the "toe" of the stage is a downstream end along the slurry flow path just prior to the plug.

Well testing has shown that production from these perforations can be highly non-uniform, which can reduce recovery from the well. One reason for non-uniform production is thought to be non-uniform placement of proppant in the formation. Without being bound by any particular theory, it is believed that in some instances with high wellbore flow rate, the proppant particle inertial difference between the heel and the toe-ward clusters may be large, thus reducing the rate at which proppant particles enter into the heel-ward clusters relative to the toe-ward end. This is especially the case with smaller hole diameters and the traditional hole geometry. Consequently, the fluid component of the slurry leaks into the heel-ward perforations while the concentration of the proppant in the slurry increases and eventually exits in the middle or toe-ward perforations. In some other instances, unintentional heel-ward bias is also possible, for example, at slow flow rates proppant settling occurs through perforations exiting on the low side of a casing with respect to a gravitational vector.

More specifically, proppant transport surface tests have shown that when a water/sand slurry is pumped through a section of a casing with a series of uniform perforations, the water exiting each perforation is roughly the same but the amount of sand exiting the perforations can vary by a factor of 2 or 3. Non-uniform proppant placement downhole is thus at least partially due to sand separation in the casing.

There is thus a need for a prediction model that allows completion engineers to specify the size, orientation and location of perforations which would provide the most uniform placement of the proppant and fluid in the formation. Such a model should also allow the selection of the proppant size, concentration, pumping rates and pumping sequence for uniform proppant placement. Finally, such a model should account for variations in formation stress including those related to prior frac stages.

Multi-phase computational fluid dynamics analysis programs are capable of predicting the distribution of proppant in slurry as it flows through casing and out the perforations. Such computations require much greater computing power than is available on a typical engineering workstation. A complete analysis of proppant distribution from multiple perforation clusters would require super computer capabilities. Such tools are not economically feasible for completion engineering studies.

Thus, there is a need for a new slurry distribution model, and for controlling the distribution of the slurry in the casing according to this model so that the completion engineers can accurately predict the placement of the proppant and fluid in the casing and the model can be run on a typical engineer workstation.

BRIEF SUMMARY OF THE INVENTION

According to an embodiment, there is a method for determining the distribution of a proppant and associated slurry exiting perforations made in a casing, which is placed in a well. The method includes receiving settling data describing the proppant settling in the casing, receiving a slip parameter describing a casing velocity of the proppant relative to a perforation velocity of the proppant, calculating with a computing device, based on a constant proppant concentration model, (1) initial flow rates $Q'(i)$ of the proppant through the perforations and (2) initial flow rates $Q'_{case}(i)$ of the proppant through the casing, wherein i is the number of perforations, and calculating with the computing device, based on (1) a variable proppant concentration model, (2) the settling data, (3) the slip parameter, (4) the initial flow rates $Q'(i)$ of the proppant through the perforations, and (5) the initial flow rates $Q'_{case}(i)$ of the proppant through the casing, normalized flow rates $Q'_s(i)$ of the proppant through the perforations.

According to anther embodiment, there is a computing device for determining the distribution of a proppant and associated slurry exiting perforations in a casing placed in a well. The computing device includes an input/output interface configured to receive settling data describing the proppant settling in the casing, and also to receive a slip parameter describing a casing velocity of the proppant relative to a perforation velocity of the proppant, and a processor connected to the input/output interface. The processor is configured to calculate, based on a constant proppant concentration model, (1) initial flow rates $Q'(i)$ of the proppant through the perforations and (2) initial flow rates $Q'_{case}(i)$ of the proppant through the casing, wherein i is the number of perforations, and to calculate, based on (1) a variable proppant concentration model, (2) the settling data, (3) the slip parameter, (4) the initial flow rates $Q'(i)$ of the proppant through the perforations, and (5) the initial flow rates $Q'_{case}(i)$ of the proppant through the casing, normalized flow rates $Q'_s(i)$ of the proppant through the perforations.

According to yet another embodiment, there is a non-transitory computer readable medium including computer executable instructions, wherein the instructions, when executed by a processor, implement the method discussed above.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
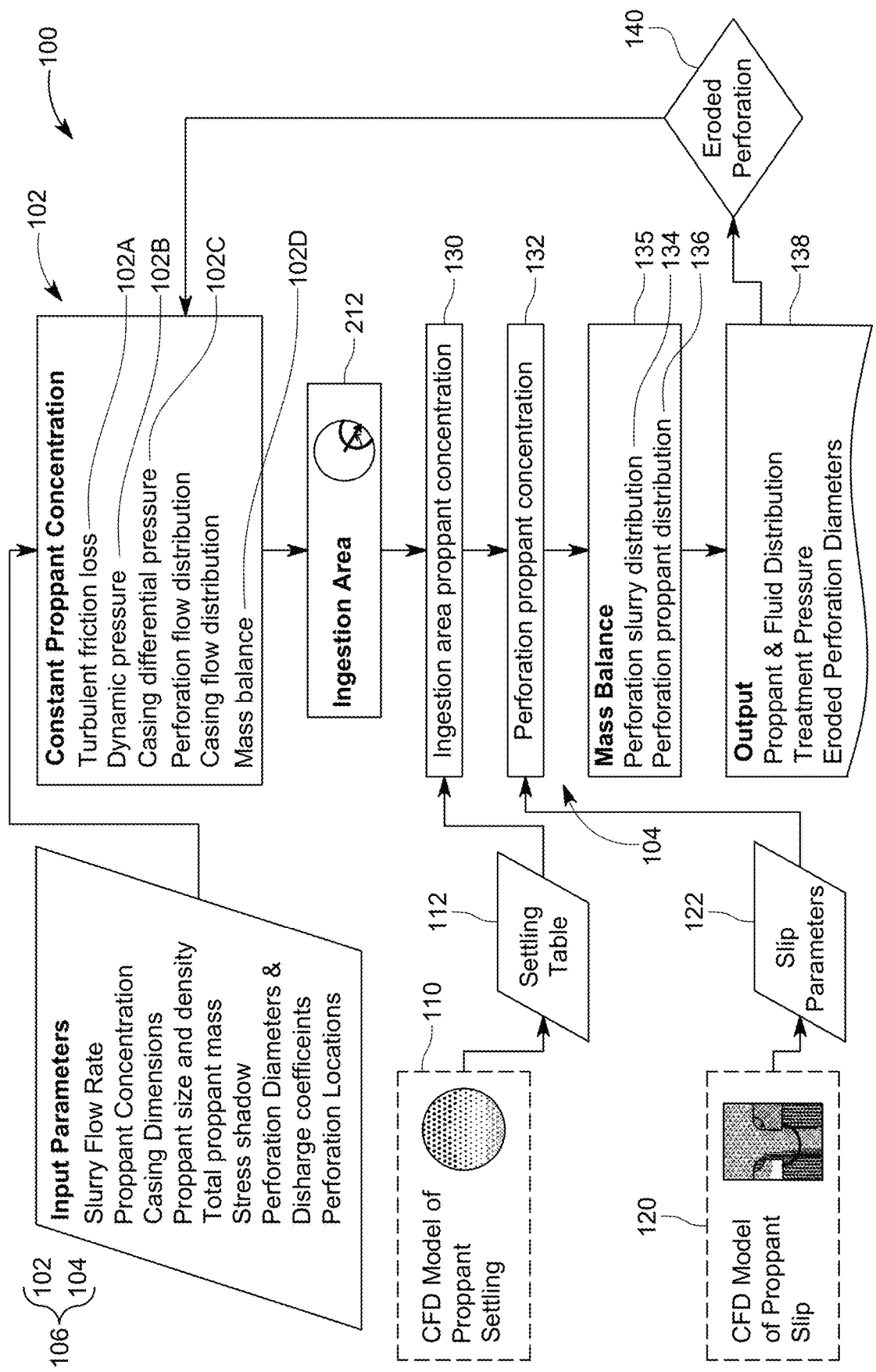
FIG. 1 is a schematic diagram of a novel method for determining the distribution of a proppant and associated slurry exiting perforations in a casing placed in a well.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a slurry that includes water and sand. However, the embodiments to be discussed next are not limited to such a slurry, but may be applied to other slurries that include other fluids and/or other proppants or additional materials. Although the embodiments described herein calculate proppant distribution in a horizontal casing, however the same approach may be used to calculate the proppant distribution in inclined or vertical casing.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a novel hybrid model that allows completion engineers to estimate the size, orientation and location of perforations in the casing for a target proppant distribution is introduced and this hybrid model provides more uniform placement of the proppant and fluid through the perforations of the casing. Such a hybrid model allows the selection of proppant size, concentration, pumping rates and pumping sequence for uniform proppant placement. In one application, such a hybrid model accounts for variations in the formation stress, including those related to prior frac stages.

Computational fluid dynamics (CFD) modeling of multi-phase transport is capable of providing the above noted information, but a complete model of multiple perforations is impractical without a supercomputer, which is not available to the typical completion engineer. This problem can also be solved on specialized engineering workstations, but this is time-consuming, and require specialized-expertise, expensive software and significant computation time.

Thus, the novel hybrid model discussed herein is configured to run on engineering workstations that are commonly available to completion engineers. Further, the novel hybrid model allows rapid comparisons of perforation completion designs.

The existing technologies for fracture modeling have focused on sand placement in the formation and assume that the sand concentration exiting each casing's perforation is the same and that the flow rate out of each perforation is a simple function of the perforation's size and an assumed discharge coefficient. These models do account for the increase in the flow area of the perforations associated with erosion. Two existing models include GOHFER and MFRAC and both are short of accurately predicting the downhole proppant placement.

CFD modeling of the slurry distribution in perforated casing and the concentration of sand exiting perforations is computationally intensive, requires a powerful engineering workstation, the use of expensive modeling codes and specialized knowledge to carry out the work. However, according to this embodiment, the novel hybrid model makes use of the results of the CFD modelling, i.e., integrates (1) the results of CFD modeling run on a supercomputer with (2) an engineering model that is run on a basic engineering workstation. FIG. 1 schematically illustrates the novel hybrid model 100. The hybrid model 100 uses the tabulated results 112 and 122 of two CFD models 110 and 120 of multiphase flow, which are loaded prior to running the engineering model 106. Note that the two CFD models 110 and 120 are run on the supercomputer and only their results are loaded into the hybrid model 100. The hybrid model 100 can then be run on a workstation or laptop or other portable computing device without the need to carry out further CFD calculations.

The first CFD model 110 calculates the gravitational settling of the proppant (e.g., sand) 230 in a horizontal casing 200 (see FIG. 2) to determine the proppant distribution in the casing 200. Similar calculations could be made for inclined casing. The model 110 accounts for the observation that each perforation 220 in the casing 200 draws from an ingestion area 212 that is only a fraction of the casing 200's cross-section area. The results 112 of these calculations are saved as a settling table. The second CFD model 120 accounts for the differential slip of the proppant 230 relative to the fluid 210 as the mixed flow enters each perforation 220. The results 122 of this model are saved as slip parameters. The results 112 and 122 of these two CFD models are provided as input to the engineering model 106.

The first stage 102 of the engineering model 106 calculates the pressure distribution in the casing 200 caused by the turbulent friction 102A and the dynamic pressure 102B of a single-phase fluid with a constant density as determined by the proppant concentration. The first stage 102 of the model also incorporates the changes in the casing differential pressure 102C caused by stress shadowing. The first stage 102 distributes the flow among each perforation 220 and calculates the average flow velocity in the casing, at each perforation, using mass balance equations 102D. Details of these calculations are discussed later.

In the second stage 104 of the model 106, the CFD tables 112 and 122 are used as inputs to determine the effects of settling and slip of proppant. The casing and perforation flow rates from the first stage 102 are used to calculate the ingestion area 212 for each perforation 220 and to interpolate the average concentration 130 of the proppant 210 in the ingestion area 212 from the settling table 112. The ingestion area 212 proppant's concentration 130 is then used with the slip parameters 122 to calculate the perforation proppant concentration 132. From the perforation proppant concentration 132, the second stage 104 of the model calculates the perforation slurry distribution 134 and the perforation proppant distribution 136 for each perforation of the casing, and finally outputs the final results 138, which include the proppant and fluid distribution, the treatment pressure, and the eroded perforation diameters. An eroded perforation module 140 may be used to update these values as this is an iterative process because the density distribution in the casing varies, which affects the flow rate out of each perforation. The eroded perforation module 140, which is discussed later in more detail, is functionally connected to the first stage 102 of the model for updating the constant proppant concentration values. Various components of the hybrid model 100 are now discussed with regard to the figures.

The CFD modelling of the proppant settling 112 relies on the observation that sand particles are observed to settle towards the bottom of horizontal casing during a water slurry flow at velocities comparable to those used for proppant placement, i.e., 1 to 20 m/s. In this regard, multiple studies have shown that a deposition of 100 to 30 mesh sand occurs in the pipe when the velocity is less than about 1.5 m/s. At higher velocities, the sand tends to concentrate towards the bottom of the pipe. An Eularian multiphase analysis of sand settling was carried out to quantify this behavior for the conditions that are present during proppant transport in the casing.

Figure 3A:
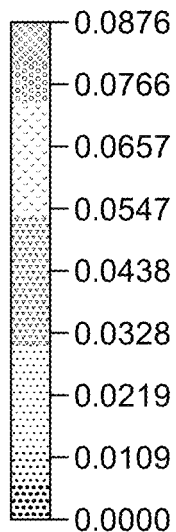
FIGS. 3A and 3B show the volume fraction of the proppant distributed in the casing for different velocities.
Figure 3A:
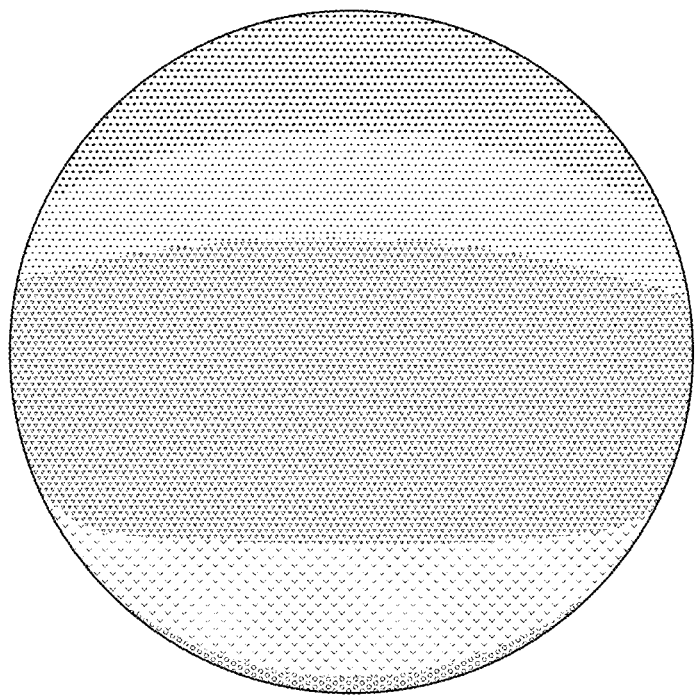
Figure 3B:
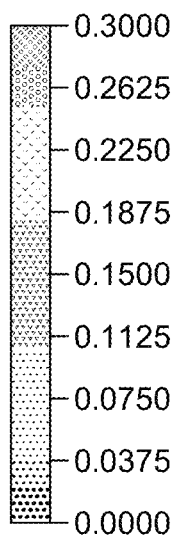
Figure 3B:
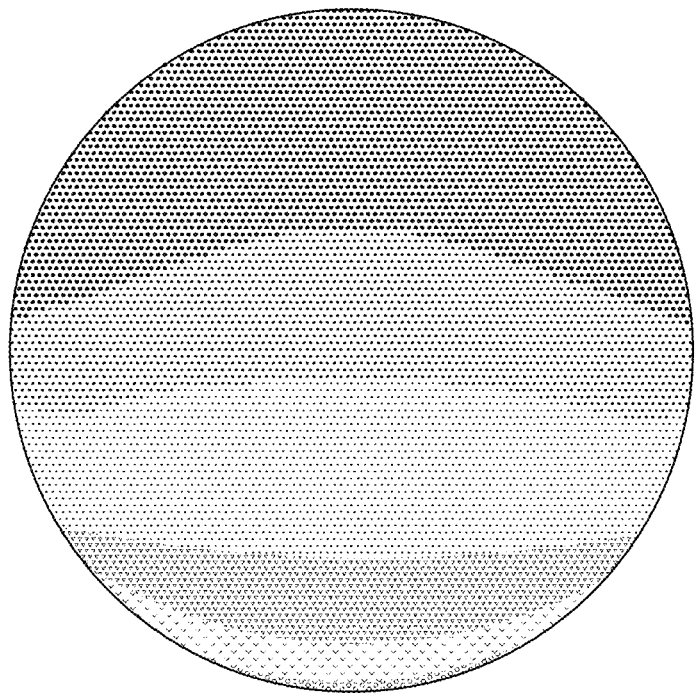

Calculations for sand settling at an axial velocity of 5 m/s for 100 and 40-mesh (i.e., diameter of sand particles is about 0.15 and 0.42 mm) sand were performed and the results are shown in FIGS. 3A and 3B. At the same axial velocity, the 40-mesh settling (see FIG. 3B) is much more pronounced than the 100-mesh (see FIG. 3A). EM-CFD calculations were carried out for 4 representative sand particle sizes and 9 representative mean casing flow velocities giving a total of 36 EM-CFD calculations. The casing flow area was divided into 1166 elements (see FIG. 5). The water mass flux and sand mass flux through each element was calculated and loaded into the 1166×4×9 sand settling table 112.

Figure 4A:
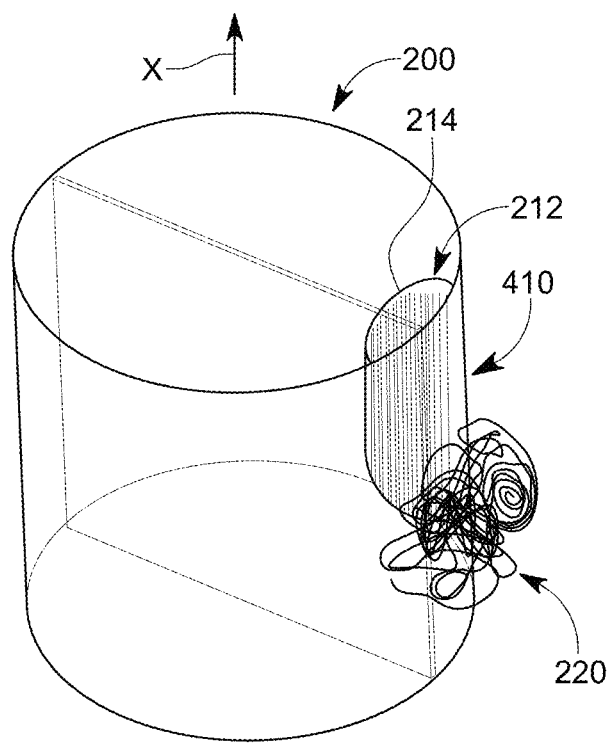
FIGS. 4A and 4B show the ingestion area associated with different perforation locations in the casing.
Figure 4B:
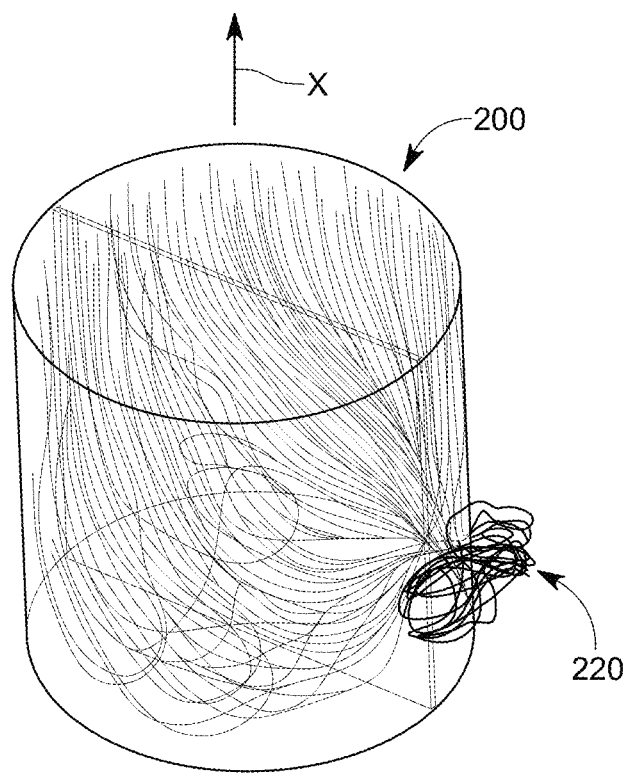

A single-phase CFD analysis of fluid element trajectories was carried out in order to determine the source of the slurry 210/230 exiting a perforation 220. The results for two axial flow velocities of 20 m/s and 0 m/s are shown in FIGS. 4A and 4B, respectively. These velocities are representative of the casing axial flow velocity near the heel and toe of the well respectively. At high axial flow velocities, the slurry exiting the perforation is drawn from a relatively small, semicircular region 410 of the flow, as shown in FIG. 4A. At the last perforation of the casing (see FIG. 4B), all of the slurry exits the perforation. The ingestion area is the section area 212 of the casing 200, immediately upstream of a perforation 220 that receives all the particles exiting the given perforation 220. This cross-sectional area 212 is bounded by an arc 214 and grows in proportion to the percentage of the flow exiting the perforation 220 relative to the total casing flow rate.

Figure 5:
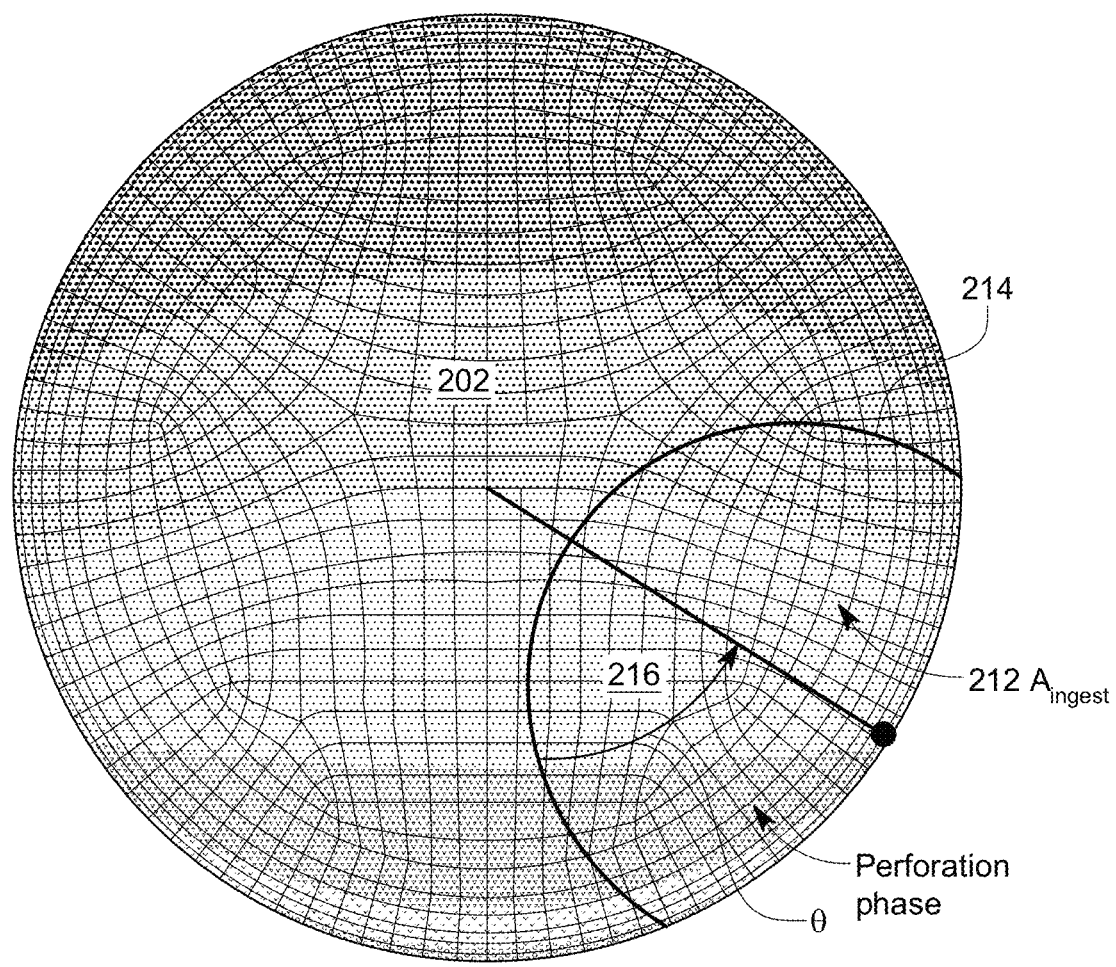
FIG. 5 illustrates the sand ingestion area associated with a perforation in the casing.

The sand ingestion area 212 is defined as an arc-shaped fraction of the casing 200's cross-section area 202 (see FIG. 5), which is proportional to the volume flow rate of the fluid 210 out of the perforation relative to the upstream flow rate in the casing. An example of the sand ingestion cross-sectional area 212 is shown in FIG. 5 together with the arc-shaped fraction 216. FIG. 5 also shows the perforation phase θ. The ingestion area proppant concentration is a function of the perforation phase θ and the ingestion area $A_{ingest}$. Note that $A_{ingest}$ is not a function of phase. The CFD data for sand concentration on the casing as a function of sand particle diameter and flow rate are tabulated and presented as results 112. The sand concentration 130 in the ingestion area 212 is then calculated by averaging the concentration in the ingestion area (see FIG. 1).

Figure 6:
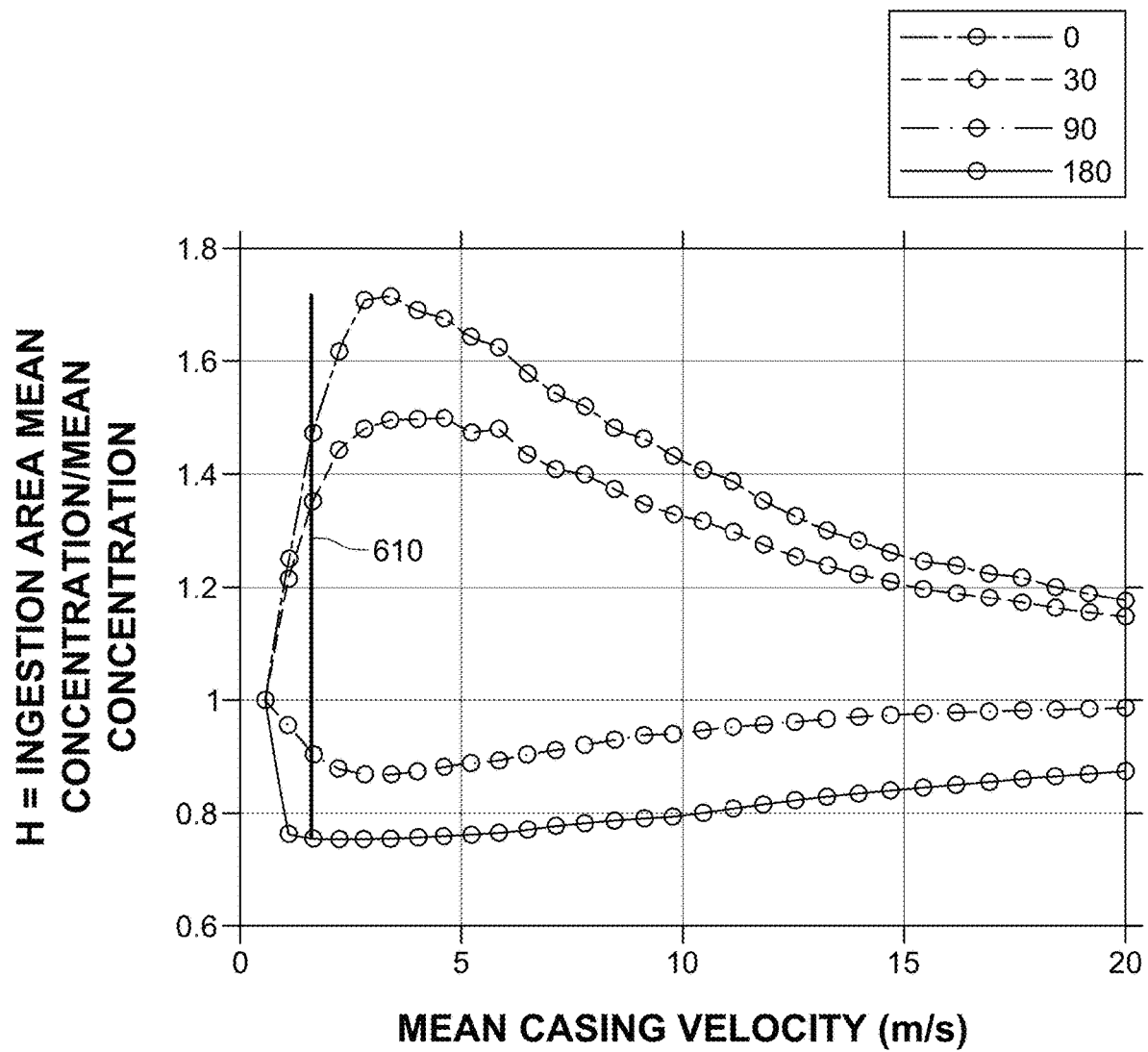
FIG. 6 illustrates the mean concentration of sand in the perforation ingestion area as a function of the mean axial velocity and perforation azimuth.

The concentration of sand 210 in the ingestion area can then be calculated for each perforation 220 as shown in FIG. 6. The plot in this figure shows the increased concentration of sand in the ingestion area near the bottom of the perforation (0 azimuth) and decreased concentration near the top (180 azimuth). The proppant concentration on the bottom has a maximum as the toe of the stage is approached. The ingestion concentration then drops to the average value at the last perforation. The line 610 indicates the velocity at which sand deposition is expected. Note that this figure plots on the Y axis the ratio h of the ingestion area mean concentration of the proppant and the mean concentration of the proppant in the casing.

Figure 7:
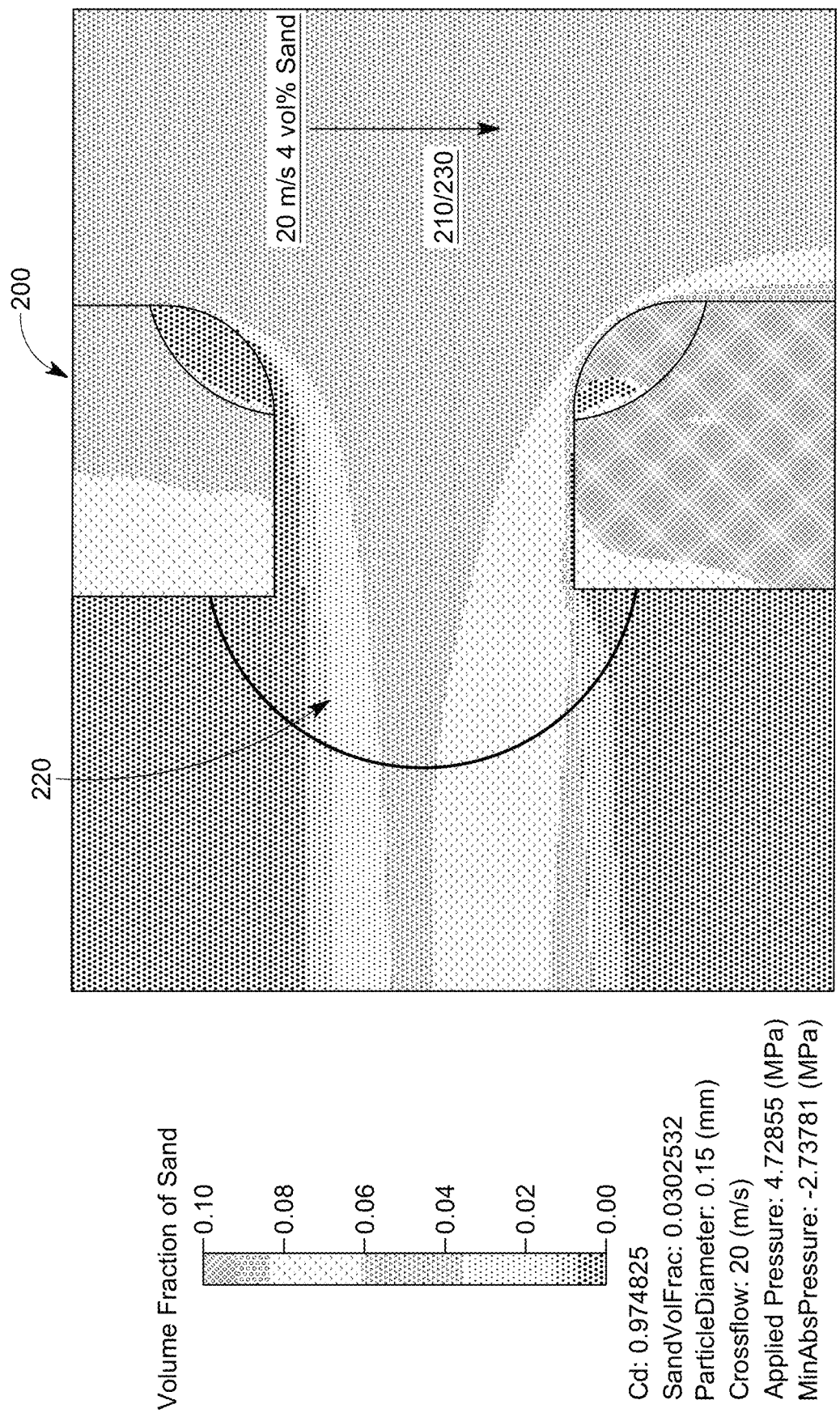
FIG. 7 illustrates the calculated sand slip of the sand through a perforation in the casing.

For the CFD model 120 of the slip parameters 122, an Eulerian multiphase CFD (EM-CFD) analysis has confirmed that the axial velocity of the slurry causes some fraction of the sand to slip past the perforation. An example illustrating the reduction in sand concentration at a high axial flow velocity is provided in FIG. 7. This figure indicates that the sand concentration increases on the downstream side (toward the bottom of the figure) of the perforation 220 and the mean concentration exiting the perforation is substantially lower than the mean sand concentration in the slurry. This example shows a calculation for 100 mesh sand (0.15 mm). The concentration of sand exiting the perforation 220 is reduced by 25% in this case relative to the mean sand concentration in the slurry 210/230 in the casing.

Multiple EM-CFD calculations were carried out to determine the sand slip as a function of the particle size and the casing flow velocity. A summary of the EM-CFD analysis assuming a mean casing concentration of 4% sand is provided in FIG. 8. Note that the X axis indicates the ratio of (1) the slurry's velocity in the casing to (2) the perforation exit velocity while the Y axis indicates the ratio of (1) the sand concentration exiting the perforation to (2) the sand concentration in the casing. The analysis was carried out at 1, 5, 10 and 20 m/s axial flow velocity for 100 (0.15-mm) 70 (0.21-mm) and 40 (0.42-mm) sand. The sand concentrations follow a power law with constants and exponents as also shown in the figure.

Figure 8:
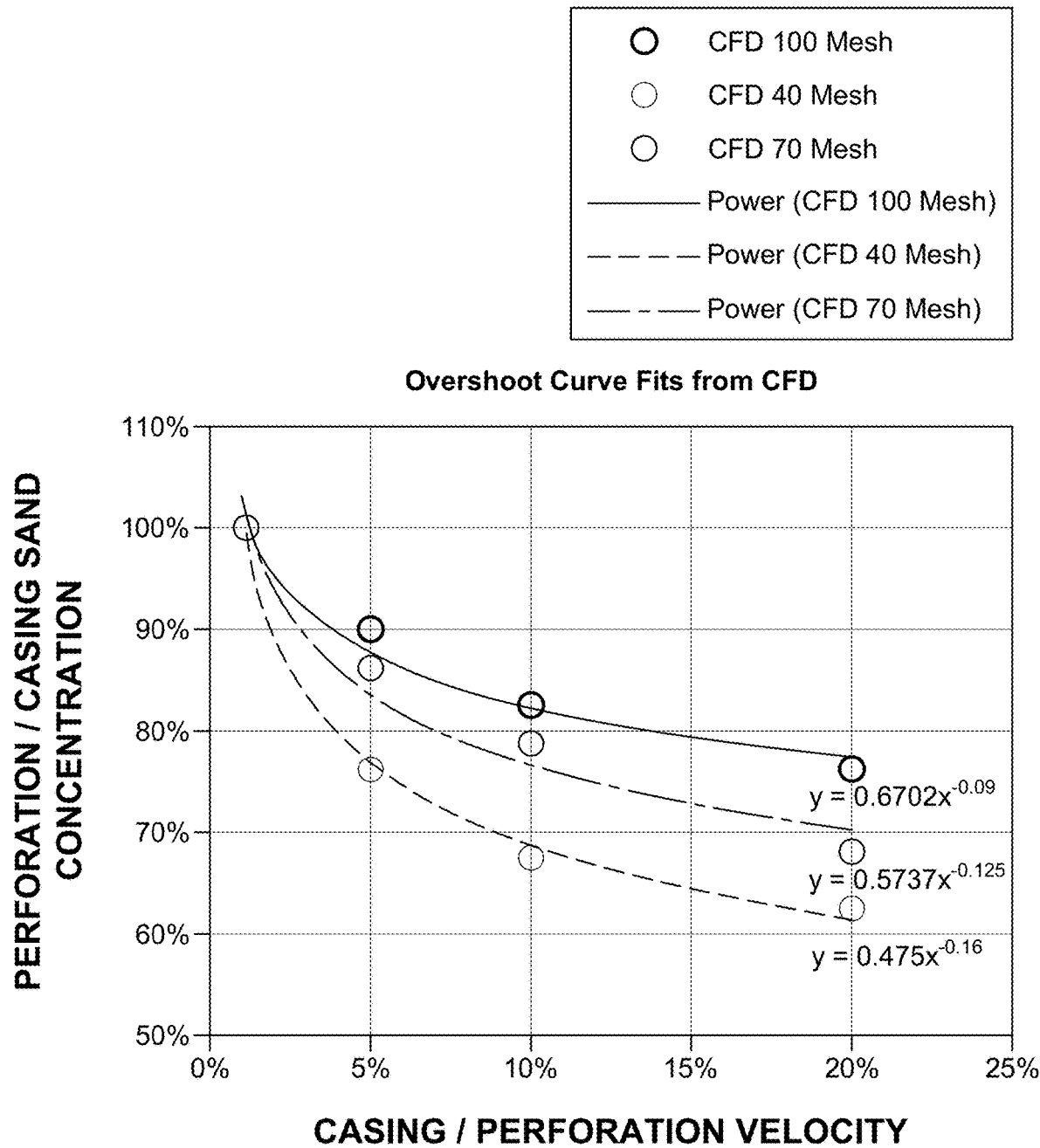
FIG. 8 shows the Eularian multiphase computational fluid dynamics analysis of sand slip effects showing sand slip parameters.
Figure 9:
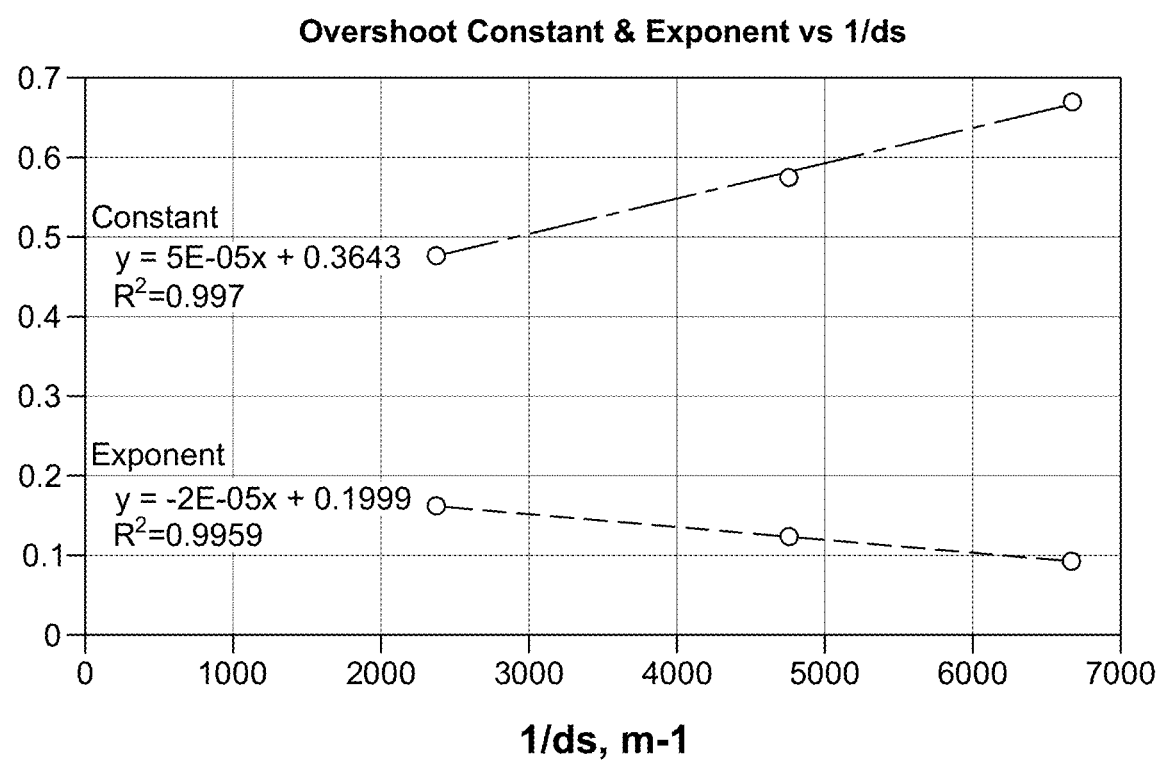
FIG. 9 illustrates the power law constant and exponent linear fits with the inverse of the sand size for the single-phase flow model.

The constants and exponents illustrated in FIG. 8 have a linear relationship with the inverse of the sand size, as shown in FIG. 9. These correlations can be used to calculate the sand concentration leaving the perforation 220 as a function of sand size and the ratio of the casing flow velocity to perforation flow velocity.

The first stage 102 of the hybrid model 106 is now discussed in more detail. Unless otherwise noted, all units are dimensionally consistent and conform to the SI metric (kg,m,s) system. The first stage 102 is, in this embodiment, a constant proppant concentration model. This embodiment assumes that the slurry can be modeled as a single-phase fluid with uniform density throughout the casing and in the perforations. The slurry density $\rho_m$ is determined by the mixture density equation:

$$\rho_m = X_s \rho_s + (1 - X_s) \rho_f, \tag{1}$$

where $X_s$ is the pumped proppant (sand) volume concentration, $\rho_s$ is the proppant density, and $\rho_f$ is the fluid density. The first stage assumes that the casing pressure differential is uniform and therefore, the flow velocity through each perforation is uniform. The initial pressure is determined by:

$$P_{init} = \frac{1}{2} \rho_m \left( \frac{Q_m}{\sum_i C_d(i) A_i(i)} \right)^2 \tag{2}$$

where $Q_m$ is the mixed flow slurry pump rate, having the unit m$^3$/s, $A_i(i)$ is the cross-sectional area of the perforation 220, m$^2$, and $C_d(i)$ is the perforation discharge coefficient.

An initial estimate of the flow out of each perforation i, is determined from equation (3) as follows:

$$Q(i) = \frac{Q_m A_i}{TFA}, \tag{3}$$

where TFA is the total flow area of all the perforations measured in m$^2$ $$TFA = \Sigma A(i). \tag{4}$$

The volumetric flow rate in the casing $Q_{case}$, above each perforation i is reduced by the flow out Q(i) of the previous perforation i−1, as described by equation (5), $$Q_{case}(i) = Q_{case}(i-1) - Q(i), \tag{5}$$

with $$Q_{case}(1) = Q_m. \tag{6}$$

These flow rates are used to calculate the turbulent pressure drop over each section of the casing, between perforations, from the pipe friction pressure loss equation, which assumes that the slurry is a fluid with the density determined by the sand fraction, as described by equation (7), $$\frac{dP_{turb}}{dL} = \frac{0.1 \times \rho_m^{0.8} v_c^{1.8} \mu^{0.2}}{D_{ci}^{1.2}}, \tag{7}$$

where $\rho_m$ is the slurry mixed density, $v_c$ is the fluid velocity in the casing, $\mu$ is the fluid viscosity, $D_{ci}$ is the casing's inside diameter, and dL is an increment in the casing's length.

For a typical fracturing case where 90 bpm are pumped through a 5.5" diameter casing, the turbulent pressure loss is relatively small—amounting to under 0.1 MPa (15 psi) over a stage, and thus, it will not result in a significant variation in the flow rate out each perforation. However, this effect may be significant in smaller casing contexts.

The axial flow of the slurry in the casing results in a lower pressure differential due to the Bernoulli effect, as described by equation (8)

$$\Delta P_{dynamic}(i) = \frac{1}{2} \rho_m v(i)_{case}^2, \tag{8}$$

where $$v(i)_{case} = Q_{case}(i)/A_{case}, \tag{9}$$

and $A_{case}$ is the internal section area 202 of the casing 200 (see FIG. 5).

At an axial speed of 20-m/s, the dynamic pressure in water is 0.2 MPa (30 psi) at the heel, dropping to zero at the toe.

Including the stress shadow effect, the casing pressure differential at each perforation is given by, $$P(i) = P_{init} - \Delta P_{turb}(i) - \Delta P_{dynamic}(i) - P_{shadow}(i), \tag{10}$$

where $P_{shadow}(i)$ is the stress shadow from nearby zones which have been already fractured. Those skilled in the art will recognize that there are a variety of possible forms for the stress shadow which typically decreases from the toe towards the heel of the facture. In one embodiment the stress shadow drops linearly from the toe of the well.

A new initial flow rate distribution among the perforations (Q'(i)) is determined by the total flow rate times the share of the flow taken by each perforation, which is proportional to the perforation area and exit velocity and therefore, the square root of the pressure differential, as given by:

$$Q'(i) = Q_m \frac{C_d(i)A(i)P(i)^{.5}}{\sum_{i=1}^{n} C_d(i)A(i)P(i)^{.5}}. \quad (11)$$

The static casing flow distribution then becomes:

$$Q'_{case}(i) = Q'_{case}(i-1) - Q'(i). \quad (12)$$

The constant proppant concentration stage 102 discussed above is followed, as shown in FIG. 1, by the variable proppant concentration stage 104. This stage 104 is now discussed in more detail. The constant slurry density model provides initial estimates of the pressure and casing flow distribution (see equations (11) and (12)) assuming a uniform proppant concentration and slurry density. The stage 104 accounts for variations in the proppant concentration and slurry density due to settling in the casing (to be provided by settling table 112) and slip (to be provided by slip parameters 122) at the perforations 220. To calculate the slip effects on the perforation flow rate, the slip parameter is now defined.

The slip parameter is given by:

$$\text{slip}(i) = g(v_{rat}, d_s), \quad (13)$$

where g is defined by the parametric equations shown in FIGS. 8 and 9, $v_{rat}$ is the ratio of (1) the casing velocity to (2) the perforation exit velocity, and $d_s$ is the proppant particle's size.

The proppant (sand in this case) concentration exiting the perforation, i, is assumed to be given by:

$$X_s(i) = \text{slip}(i)X_s, \quad (14)$$

and the mixture's density is given by:

$$\rho_m(i) = X_s(i)\rho_s + (1-X_s(i))\rho_f. \quad (15)$$

The perforation flow rate Q"(i) is updated in stage 104 to account for the variation in the mixture's density $\rho_m(i)$, based on equation (15), so that $$Q''(i) = Q_m \frac{C_{di}A_i \left(\frac{P(i)}{\rho_m(i)}\right)^{.5}}{\sum_{i=1}^{n} C_{di}A_i \left(\frac{P(i)}{\rho_m(i)}\right)^{.5}}. \quad (16)$$

Next, the stage 104 calculates the flow rates of sand and fluid in the casing based on mass balance equations:

$$Q_{scase}(i) = Q_{scase}(i-1) - X_s(i)Q''(i), \quad (17)$$

$$Q_{fcase}(i) = Q_{fcase}(i-1) - (1-X_s(i))Q''(i), \text{ and} \quad (18)$$

$$Q_{case}''(i) = Q_{scase}(i) + Q_{fcase}(i), \quad (19)$$

where $Q_{scase}(i)$ is the flow rate of the proppant (e.g., sand) and $Q_{fcase}(i)$ is the flow rate of the fluid (e.g., water). The casing sand and fluid rates above the first perforation is $$Q_{scase}(1) = X_s Q_m, \quad (17)$$

$$Q_{fcase}(1) = (1-X_s)Q_m, \text{ and} \quad (18)$$

The second stage 104 then updates the average casing sand concentration at each perforation based on the following equation:

$$X_{scase}(i) = \frac{Q_{scase}(i)}{Q_{case}(i)}. \quad (20)$$

The ingestion area proppant concentration is next calculated. As discussed above, the water mass flux and sand mass flux through each of 1166 area elements was calculated for 4 particle sizes and 9 mean casing flow velocities and loaded into a 1166×4×9 sand concentration table. The sand concentration at each element can then be determined from a linear extrapolation from elements of the table for the desired sand size, $d_s$, and casing flow rate $Q_{case}$.

The mean sand concentration in the ingestion area, at each perforation, relative to the mean sand concentration in the casing is given by:

$$h_{ingest}(i) = \text{weight} \times F(d_s, D_{case}, X_{scase}(i), Q_{case}''(i), Q''(i), \theta(i)), \quad (21)$$

where weight is a factor that accounts for incomplete settling related to the non-linear properties of the fluids used. In a typical, low-concentration viscoelastic fluid, weight=50% based on the results of proppant transport surface testing of sand settling and distribution. Note that F is a computation that includes entries from an interpolation of the sand settling table 112. The computation F depends on the sand size $d_s$, the diameter $D_{case}$ of the casing, the sand concentration $X_s$, the updated casing flow distribution $Q_{case}''(i)$ defined in equation (19), the updated perforation flow rate Q"(i) [discussed above with regard to equation (16), and the azimuth $\theta(i)$ of the perforation 220. The ingestion area 212 is determined by the ratio of (1) the perforation flow rate, i.e., Q"(i) to (2) the casing flow rate $Q''_{case}(i)$. In a typical, low-concentration viscoelastic fluid, the weight=50% based on the results of proppant transport surface testing of sand settling and distribution.

The concentration of the proppant in the ingestion area of each perforation is then given by:

$$X_{ingest}(i) = h_{ingest}(i)X_{scase}(i) \quad (22)$$

and the concentration of sand $X_s'(i)$ and slurry density $\rho_m'(i)$ exiting each perforation 220 becomes:

$$X_s' = \text{slip}(i)X_{ingest}(i), \text{ and} \quad (23)$$

$$\rho_m'(i) = X_s'(i)\rho_s + (1-X_s'(i))\rho_f. \quad (24)$$

The perforation exit velocity is now given by:

$$v_o(i) = \sqrt{\frac{2P(i)}{\rho_m'(i)}}, \quad (25)$$

and the dynamic proppant and fluid flow rates out of each perforation are:

$$Q_s(i) = v_o(i)A(i)C_d(i)X_s'(i), \text{ and} \quad (26)$$

$$Q_f(i) = v_o(i)A(i)C_d(i)(1-X_s'(i)). \quad (27)$$

The dynamic proppant flow rate $Q_s(i)$ and the dynamic fluid flow rate $Q_f(i)$ are then normalized to force the total rate to equal the pumped sand and fluid rates, i.e., a mass balance is performed in step 135 in FIG. 1 to obtain the corresponding normalized values:

$$Q_s'(i) = Q_s(i)\frac{Q_s}{\sum Q_s(i)}, \text{ and} \quad (28)$$

$$Q_f'^{(i)}(i) = Q_f(i)\frac{Q_f}{\sum Q_f(i)}. \quad (29)$$

Then, in step 138 (see FIG. 1), the slurry rate out of each perforation $Q'''(i)$ becomes:

$$Q'''(i)=Q_s'(i)+Q_f'(i). \qquad (30)$$

In this way, the second stage 104 generates the proppant rate and the slurry rate out of each perforation, based on the settling values 112, the slip parameters 122, ingestion area 212, and the mass balance condition. Additional parameters may be added to the model to account for screenout or fracture pressure changes during sand placement. The erosion model used in step 140 in FIG. 1 assumes that the perforation diameter for each perforation of the casing is not constant as significant perforation erosion may occur. This erosion is accommodated in the model by calculating a new perforation flow area based on the total mass flow or proppant through each perforation after placing an increment of total proppant mass. The erosion model assumes a linear growth of the perforation diameter per increment of proppant mass, for example, based on equation:

$$d_p'(i)=d_p(i)+ER\times\rho_s Q_s'(i), \qquad (31)$$

where ER is the erosion rate. The new diameter of the perforation may be input at the first stage 102, as illustrated in FIG. 1, and the model 106 runs again to track sand placement.

Figure 10:
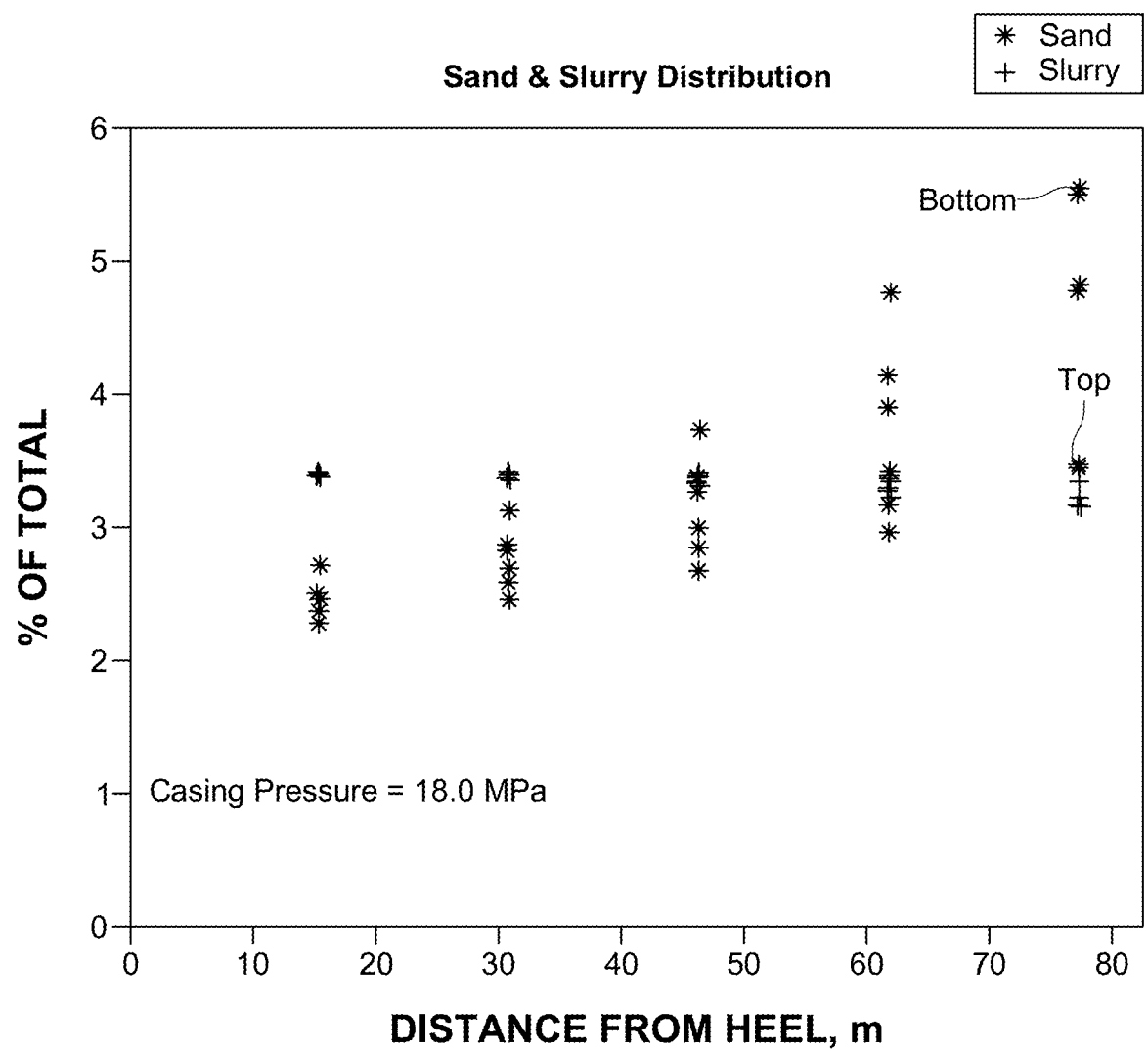
FIG. 10 illustrates the output of the model for plural clusters with no stress shadow effect.

An example of the model 106's output obtained in step 138 is illustrated in FIG. 10. This is an example of 5 clusters, each cluster having 6 perforations, the 5 clusters spaced at 15-m spacing in an 80-m long horizontal completion. Thus, the X axis in FIG. 10 shows the position of the clusters from the heel of the casing and the Y axis shows the percentage of the total sand pumped that is placed through each perforation. All perforations have the same diameter.

The perforations azimuths are phased at 60 degrees in each cluster. FIG. 10 shows that more sand exits perforations near the bottom of the casing than at the top. This example illustrates the effect of the slip past the perforations, which reduces the fraction of sand placed at the heel relative to the toe of the well. Sand settling is minimal at the heel but at the toe, the bottom perforations take almost twice as much sand as those on top. The volume of slurry placed is relatively uniform, decreasing slightly due to the turbulent pressure loss in the casing.

Figure 11:
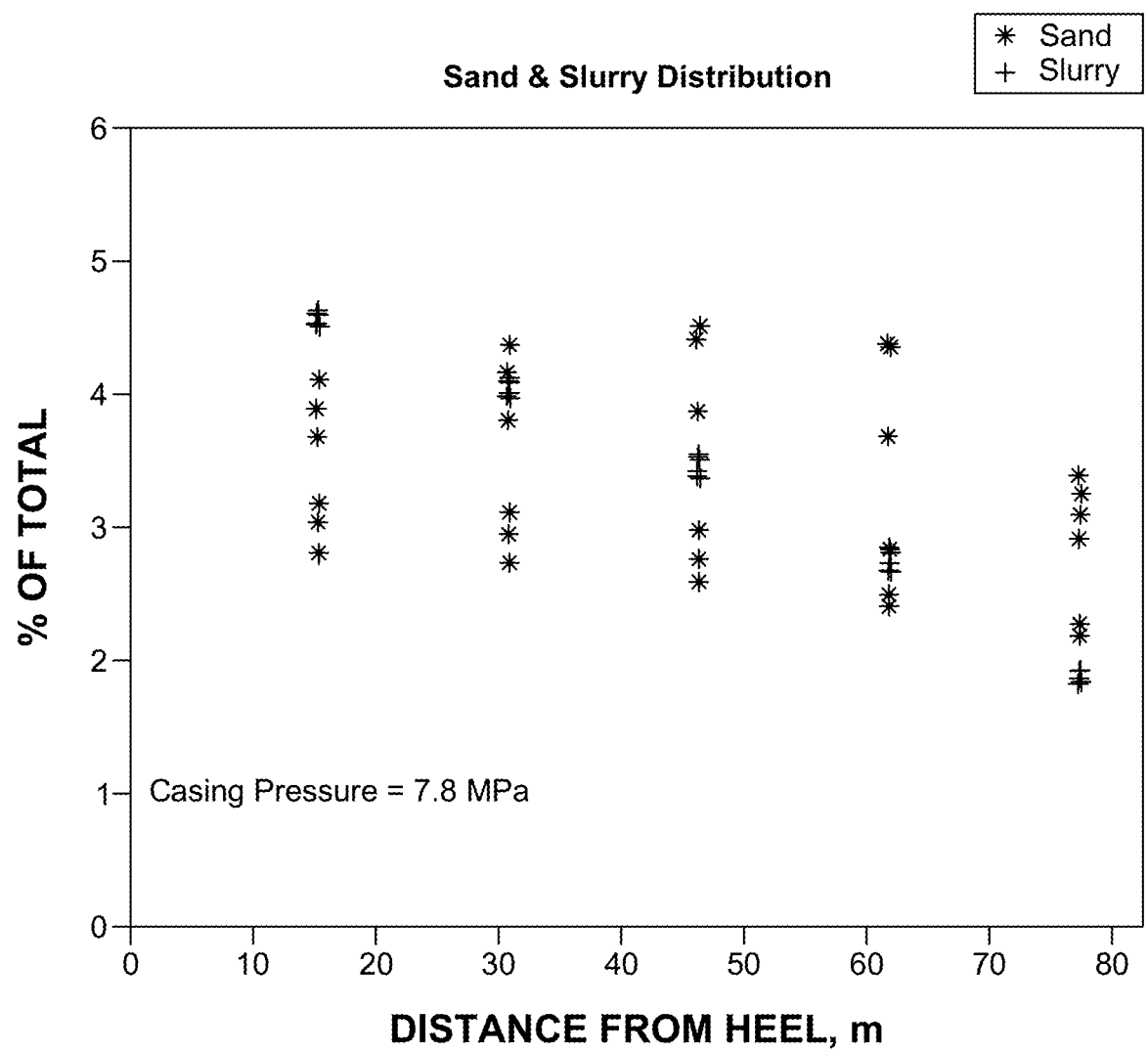
FIG. 11 illustrates the output of the model for the plural clusters with high stress shadow effect.

Another example showing the effect of a substantial linear stress shadow on the same completion is provided in FIG. 11. Note that hydraulic fractures form because the injection rate exceeds the flow capacity of the formation. Because the injection volume cannot be accommodated, the injection pressure rises, which presses, in all directions, on the casing and its perforations. As the well pressure deforms the perforation or casing, it changes the stress within the formation. The "breakdown" pressure is that pressure within the casing when the pressure creates a large enough stress in the formation to cause it to fail. A rock in the formation tends to fail first in tension and thus it initiates the hydraulic fracture. Thus, a hydraulic fracture forms because the injection pressure, whose increase is due to limited flow capacity in the formation, deforms the formation, which changes the stress in the formation leading to failure.

The hydraulic fracture propagates in a similar manner. When the injection rate entering an initiated hydraulic fracture exceeds the leakoff rate, the injection pressure rises, which causes the hydraulic fracture to deform and increase in width to accommodate the new volume of fluid, and also the formation to fail at the leading edge of the hydraulic fracture and the hydraulic fracture to increase in dimension to accommodate the new volume of fluid. The deformation of the hydraulic fracture, both the changing width along the body of the hydraulic fracture and the increased dimension (length and/or height) of the hydraulic fracture along the leading edge cause a change in the stress field in the formation. The term "stress shadows" is used for these stress changes induced by the formation deformations caused by the hydraulic fracture. The stress shadow reduces both the slurry and sand placement near the toe of the well as noted in FIG. 11. The slurry rate in this example is reduced, which leads to greater sand settling and more variation from the top to the bottom perforations in each cluster.

The examples shown in FIGS. 10 and 11 are meant to illustrate the model outputs and the ease of changing parameters such as flow rate, and stress shadow to quickly evaluate completion designs options for the hybrid model 106.

Figure 12:
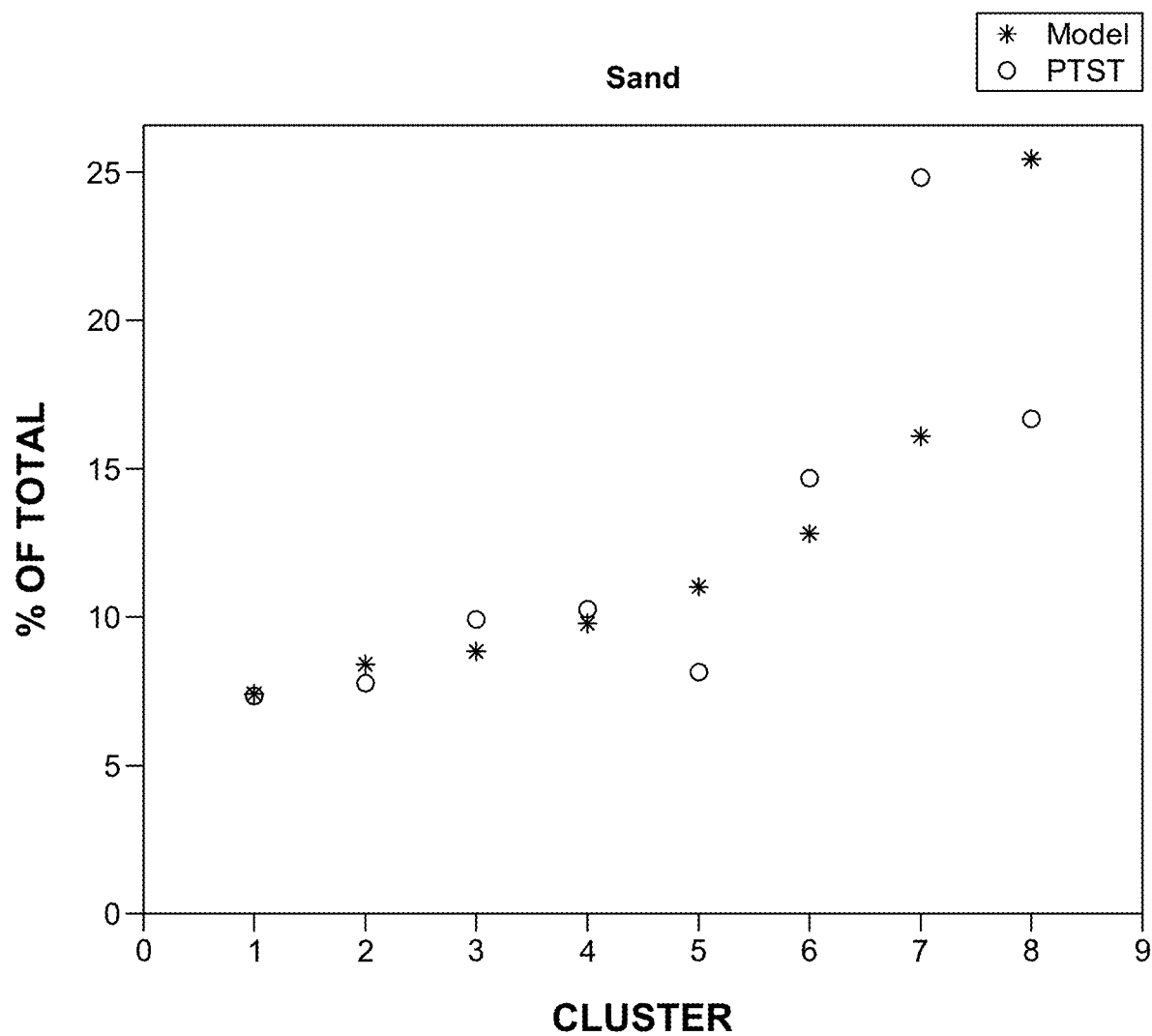
FIG. 12 compares the model's results with a proppant transport surface test.

A comparison of the hybrid model's output with the results of a proppant placement surface test (PTST) is shown in FIG. 12. This surface test involved pumping sand slurry through casing with 8 clusters of perforations. The model has been verified against 8 separate tests of this type. The results predicted by the model 106 are very close to the experimental test, with a deviation for the last two clusters.

Figure 2:
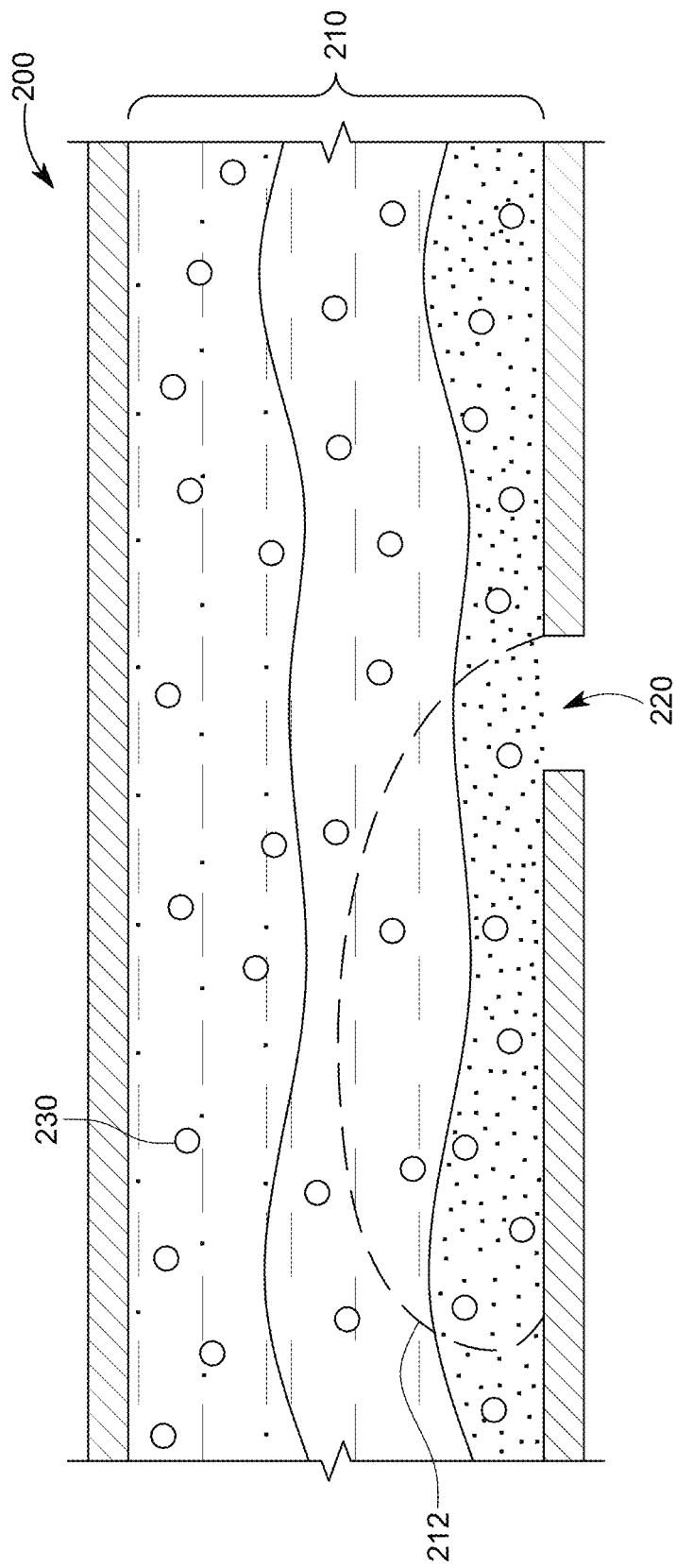
FIG. 2 illustrates the distribution of the proppant and fluid in a casing placed in a horizontal well.
Figure 13:
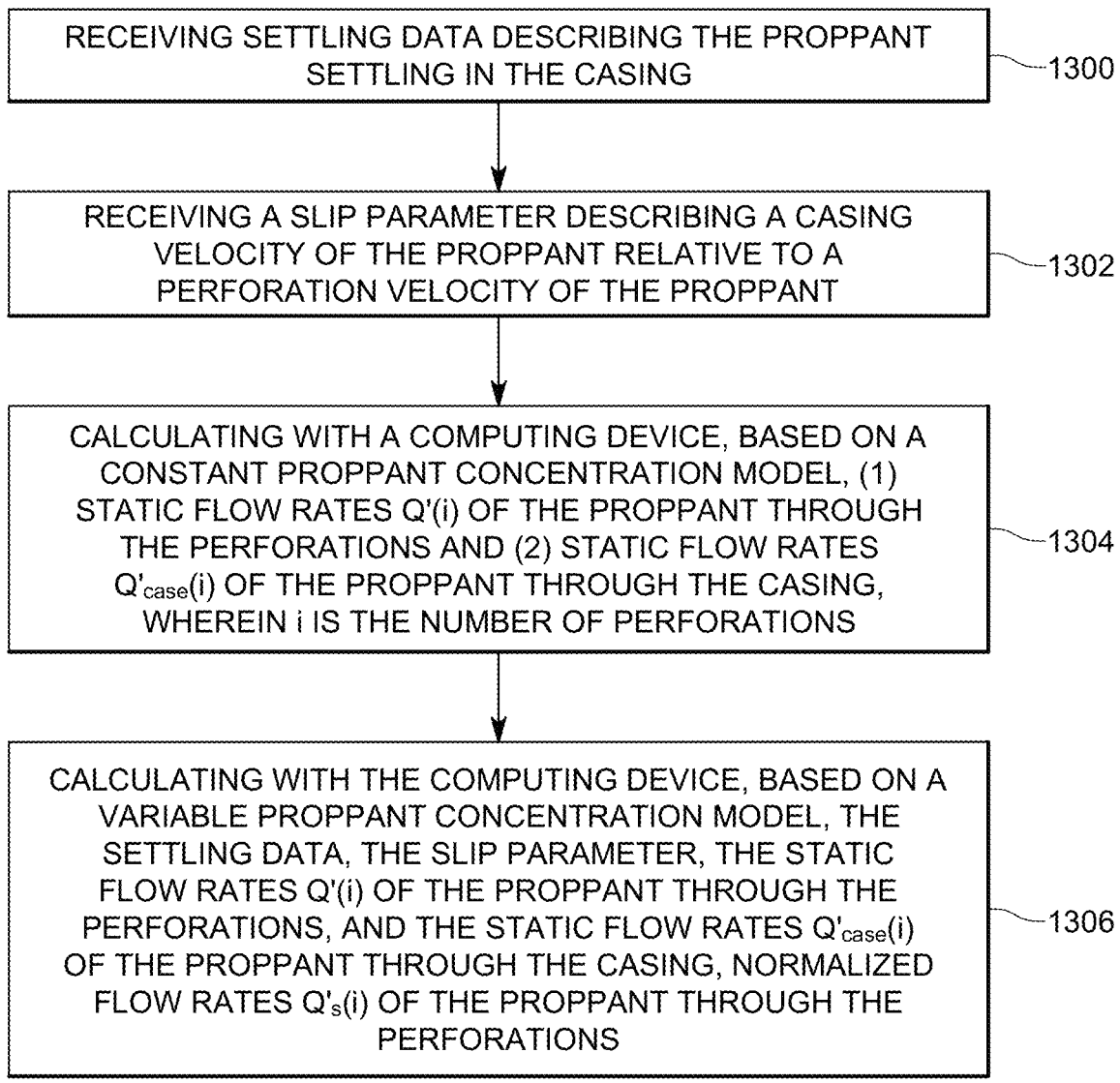
FIG. 13 is a flow chart of a method for determining the distribution of a proppant and associated slurry exiting perforations in a casing placed in a well.

A method for determining the distribution of a proppant and associated slurry exiting perforations 220 in a casing 200 placed in a well is now discussed with regard to FIGS. 1, 2, and 13. The method includes a step 1300 of receiving settling data 112 describing the proppant 230 settling in the casing 200, a step 1302 of receiving a slip parameter 122 describing a casing velocity of the slurry 210/230 relative to a perforation velocity of the slurry 210/230, a step 1304 of calculating with a computing device 1400, based on a constant proppant concentration model 102, (1) initial flow rates $Q'(i)$ of the proppant 230 through the perforations 220 and (2) initial flow rates $Q'_{case}(i)$ of the slurry 210/230 through the casing 200, wherein i identifies each perforation number, and a step 1306 of calculating with the computing device 1400, based on a variable proppant concentration model 104, the settling data 112, the slip parameter 122, the initial flow rates $Q'''(i)$ of the proppant 230 through the perforations 220, and the initial flow rates $Q''_{case}(i)$ of the proppant 230 through the casing 200, normalized flow rates $Q'_s(i)$ of the proppant 230 through the perforations 220. The settling data 112 and the slip parameter 122 are calculated with a supercomputer, while the computing device 1400 is an engineer workstation, which is slower than the supercomputer.

In one application, the method further includes calculating an ingestion area for each perforation, wherein the ingestion area is determined by a ratio of (1) the static perforation flow rate $Q'(i)$ to (2) the static casing flow rate $Q'_{case}(i)$, and/or calculating an ingestion area proppant concentration $X_{ingest}(i)$ based on the ingestion area and the settling data, and/or calculating a perforation proppant concentration $X_s'(i)$ based on the ingestion area proppant concentration $X_{ingest}(i)$ and the slip parameter, and/or calculating dynamic flow rates $Q_s(i)$, based on the variable proppant concentration model 204, as a function of the perforation proppant concentration $X_s'(i)$, corresponding areas of the perforations, and corresponding perforation exit velocities, and/or performing a mass balance to obtain the normalized flow rates $Q'_s(i)$ of the proppant 210 through the perforations 220, based on the dynamic flow rates $Q_s(i)$, and/or sizing the perforations for a casing based on the calculated normalized flow rates $Q'_s(i)$ of the proppant 210.

Figure 14:
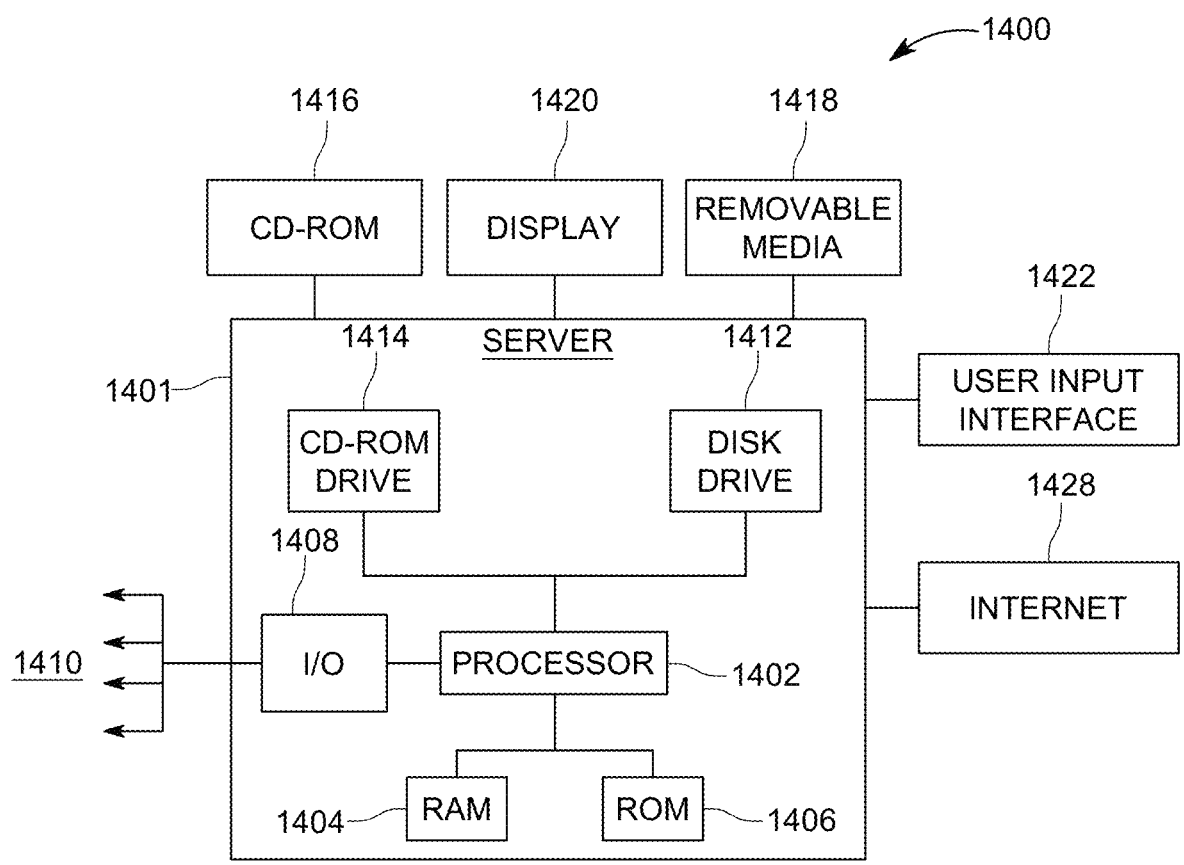
FIG. 14 is a schematic diagram of a computing device in which the methods discussed herein are implemented.

The model and method discussed above may be implemented in a computing device as illustrated in FIG. 14. Hardware, firmware, software or a combination thereof may be used to perform the various steps and operations described herein. Computing device 1400 of FIG. 14 is an exemplary computing structure that may be used in connection with such a system.

Computing device 1400 suitable for performing the activities described in the above embodiments may include a server 1401. Such a server 1401 may include a central processor (CPU) 1402 coupled to a random access memory (RAM) 1404 and to a read-only memory (ROM) 1406. ROM 1406 may also be other types of storage media to store programs, such as programmable ROM (PROM), erasable PROM (EPROM), etc. Processor 1402 may communicate with other internal and external components through input/output (I/O) circuitry 1408 and bussing 1410 to provide control signals and the like. Processor 1402 carries out a variety of functions as are known in the art, as dictated by software and/or firmware instructions.

Server 1401 may also include one or more data storage devices, including hard drives 1412, CD-ROM drives 1414 and other hardware capable of reading and/or storing information, such as DVD, etc. In one embodiment, software for carrying out the above-discussed steps may be stored and distributed on a CD-ROM or DVD 1416, a USB storage device 1418 or other form of media capable of portably storing information. These storage media may be inserted into, and read by, devices such as CD-ROM drive 1414, disk drive 1412, etc. Server 1401 may be coupled to a display 1420, which may be any type of known display or presentation screen, such as LCD, plasma display, cathode ray tube (CRT), etc. A user input interface 1422 is provided, including one or more user interface mechanisms such as a mouse, keyboard, microphone, touchpad, touch screen, voice-recognition system, etc.

Server 1401 may be coupled to other devices, such as flowmeters, pressure gauges, and other measurements devices that are present at the well. In one application, the server is connected to a well's server that stores all this information. The server may be part of a larger network configuration as in a global area network (GAN) such as the Internet 1428, which allows ultimate connection to various landline and/or mobile computing devices.

The disclosed embodiments provide a method and computer software for calculating the distribution of a proppant and associated slurry exiting perforations in a casing, and the model can be run on a workstation or laptop. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Figure 15:
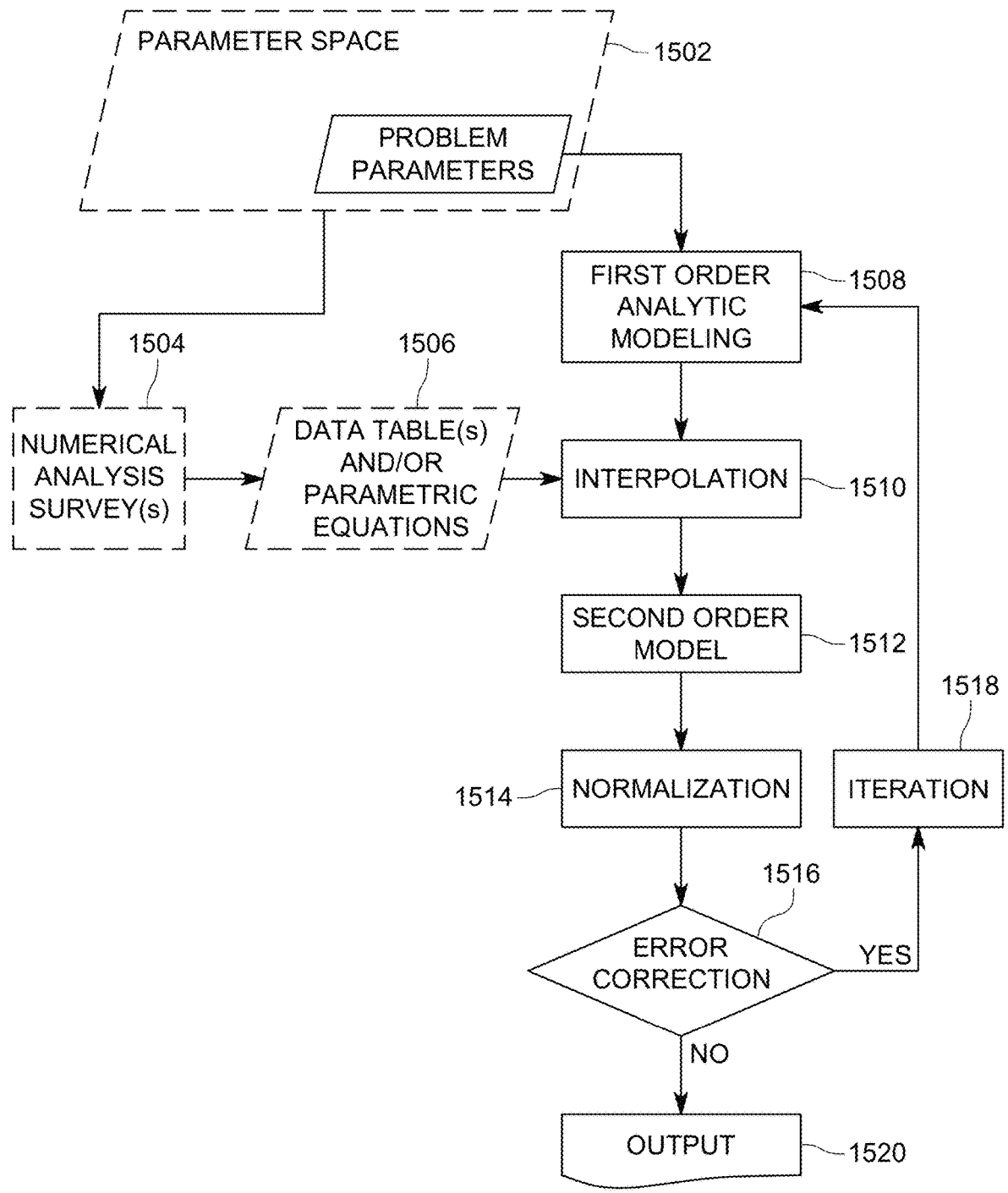
FIG. 15 is a flow chart of a method for determining a state of a system.

This disclosure anticipates broad application of the generic approach to enable the use of engineering work stations to reference tabulated and data from complex numerical calculations to obtain timely results without costly recalculation. This approach can be applied to any calculation where the parameter space is well defined such as the proppant placement problem disclosed herein. Parameters from at least one numerical calculation may be tabulated and then obtained for the specific problem by numerical interpolation or by parameterized equations using curve fitting. Referencing FIG. 15, any problem that is amenable to numerical analysis can be defined by a parameter space 1502. Numerical surveys 1504 are carried out on discrete elements of the problem using discrete values parameters spanning the space. The Eularian multiphase CFD analyses of particle settling as a function of flow velocity described in this disclosure is one example of such a data survey on a limited aspect of the proppant distribution problem. Another example is the Eularian multiphase CFD analysis of proppant slip past an individual perforation described in this disclosure. These surveys may involve computational fluid dynamics, heat flow, structural analysis or other numerical analysis methods that require significant computing time and power. The results of the numerical surveys are tabulated and stored in a database 1506 or as constants in parametric equations. The components of the numerical studies are indicated in FIG. 15 by dashed lines.

A first order analysis of a specific problem with parameters that are encompassed by the parameter space 1502 is carried out in step 1508 to define relevant parameters of the problem. For example, the analytical model discussed in this disclosure determines the distribution of casing and perforation flow rates by assuming single-phase flow, which allows a closed analytical solution. The first order results are used in step 1512 to generate a second order solution using the tabulated and/or parameterized equations 1506 generated by the numerical surveys. For example, an analytical solution of the flow rate in the casing provides casing flow velocity at a given perforation. The proppant concentration at a specific location in perforated casing is then determined by interpolation of the tabulated data at the analytically determined velocity, as illustrated in step 1510. In the example discussed herein, the proppant slip parameterized equations are used to evaluate proppant slip for any proppant size and at the analytically determined casing and perforation flow velocities.

The second order solution obtained in step 1512 is normalized in step 1514 using conservation principles such as conservation of mass in the case of the proppant distribution model. Other conserved quantities such as momentum or energy may be used to normalize the solution. This normalization may introduce errors, which can be evaluated and corrected in step 1516 by iterating the solution as indicated by step 1518.

The hybrid method discussed above with regard to FIG. 15 may be summarized as follow. The hybrid method calculates a state of a physical system, wherein the state may be, for example, the fluid and proppant flow through a perforating casing. Those skilled in the art would understand that is just one possible implementation of the method illustrated in FIG. 15. The method includes a step 1502 of defining a parameter space of the physical system, a step 1504 of completing at least one numerical analysis of an aspect of the physical system that is not amenable to analytic modeling, a step 1506 of tabulating results of the at least one numerical analysis or fitting the results of the at least one numerical analysis with parametric equations describing the physical system, a step 1508 of completing a first order analysis of the physical system, a step 1512 of refining results of the first order analysis using at least one of the tabulated results and the parametric equations, and a step 1514 of normalizing the refined results using conserved quantities. The refined results describe the state of the system.

In one application, the conserved quantities include a mass, and the physical system is a distribution of proppant and slurry though a perforated casing. In this application, the analytic solution is determined from a single-phase flow of a fluid with a density equal to a mean density of the slurry.

At least one numerical analysis determines settling of proppant in the casing. The at least one numerical analysis determines a slip of proppant past the perforation.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for forming perforations in a casing which is placed in a well, the method comprising:
   determining the distribution of a proppant and associated slurry exiting perforations to be made in the casing, the determining step comprising:
      receiving settling data describing the proppant settling in the casing;
      receiving a slip parameter describing a casing velocity of the proppant relative to a perforation velocity of the proppant;
   calculating with a computing device, based on a constant proppant concentration model, (1) initial flow rates $Q'(i)$ of the proppant through the perforations and (2) initial flow rates $Q'_{case}(i)$ of the proppant through the casing, wherein i is the number of perforations; and
   calculating with the computing device, based on (1) a variable proppant concentration model, (2) the settling data, (3) the slip parameter, (4) the initial flow rates $Q'(i)$ of the proppant through the perforations, and (5) the initial flow rates $Q'_{case}(i)$ of the proppant through the casing, normalized flow rates $Q'_s(i)$ of the proppant through the perforations;
   placing the casing in a well adjacent to a formation;
   based on the normalized flow rates $Q'_s(i)$, forming perforations in the casing with a size, orientation, and location to provide a substantially uniform placement of proppant and fluid in the formation; and
   pumping slurry comprising proppant and fluid into the casing, through the perforations, and into the formation.

2. The method of claim 1, wherein the settling data and the slip parameter are calculated with a supercomputer, while the computing device is an engineer workstation, which is slower than the supercomputer.

3. The method of claim 1, the determining step further comprising:
   calculating an ingestion area for each perforation, wherein the ingestion area is determined by a ratio of (1) the static perforation flow rate $Q'(i)$ to (2) the static casing flow rate $Q'_{case}(i)$.

4. The method of claim 3, the determining step further comprising:
   calculating an ingestion area proppant concentration $X_{ingest}(i)$ based on the ingestion area and the settling data.

5. The method of claim 4, the determining step further comprising:
   calculating a perforation proppant concentration $X_s'(i)$ based on the ingestion area proppant concentration $X_{ingest}(i)$ and the slip parameter.

6. The method of claim 5, the determining step further comprising:
   calculating dynamic proppant perforation flow rates $Q_s(i)$, based on the variable proppant concentration model, as a function of (1) the perforation proppant concentration $X_s'(2)$ corresponding areas of the perforations, and (3) corresponding perforation exit velocities.

7. The method of claim 6, the determining step further comprising:
   performing a mass balance to obtain the normalized flow rates $Q'_s(i)$ of the proppant through the perforations, based on the dynamic proppant perforation flow rates $Q_s(i)$.

* * * * *